United States Patent [19]
Haggerty

[11] 3,766,029
[45] Oct. 16, 1973

[54] ELECTROCHEMICAL MACHINING TOOL FOR MACHINING CONJUGATE SURFACES OF REVOLUTION

[75] Inventor: William Andrew Haggerty, Cincinnati, Ohio

[73] Assignee: Cincinnati Milacron Inc., Cincinnati, Ohio

[22] Filed: Sept. 19, 1969

[21] Appl. No.: 859,302

[52] U.S. Cl.............. 204/129.5, 29/148.4, 51/71, 51/161, 204/212, 204/224 M, 204/284
[51] Int. Cl............................ B23p 1/04, B23p 1/14
[58] Field of Search............. 204/284, 212, 143 M, 204/224; 51/161, 162, 71; 29/148.4

[56] References Cited
UNITED STATES PATENTS

| | | | |
|---|---|---|---|
| 2,164,867 | 7/1939 | Blood............................... | 51/161 X |
| 3,125,665 | 3/1964 | Snider......................... | 204/224 UX |
| 3,160,994 | 12/1964 | Bonin.................................... | 51/161 |
| 3,238,114 | 3/1966 | Halverstadt et al................ | 204/224 |
| 3,271,281 | 9/1966 | Brown et al.................... | 204/143 M |

OTHER PUBLICATIONS

De Barr et al., Electrochemical Machining, Macdonald & Co., Ltd., London, 1968, pages 48, 49, 177, 179.

Primary Examiner—F. C. Edmundson
Attorney—Marechal, Biebel, French and Bugg

[57] ABSTRACT

An electrochemical machining tool including two machining surfaces having a predetermined angular relationship to each other simultaneously machines adjacent surfaces on a rotating workpiece. The dimension of each machining surface in the direction of relative rotational movement is such that the transverse gap dimensions between the workpiece and the tool are maintained within predetermined limits throughout the machining operation. Each machining surface on the tool has associated therewith an electrolyte channel which is positioned with respect to its corresponding machining surface so that electrolyte flows from each channel and across the machining surface toward the smallest radial gap dimension. Both machining surfaces are supplied with electrical current from the same power source.

5 Claims, 13 Drawing Figures

Patented Oct. 16, 1973

INVENTOR
WILLIAM ANDREW HAGGERTY
BY
Marechal, Biebel, French & Bugg
ATTORNEYS

Patented Oct. 16, 1973
3,766,029
2 Sheets-Sheet 2
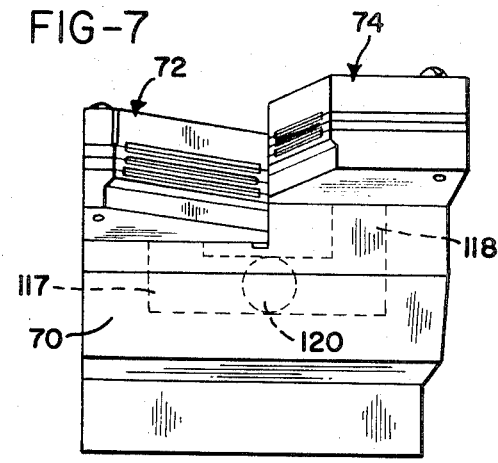
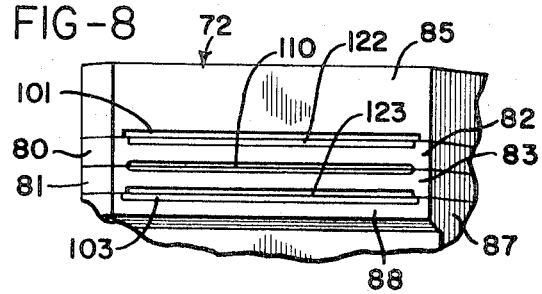
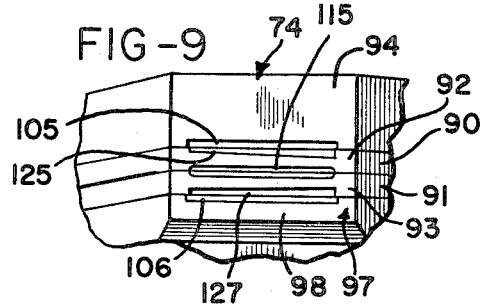
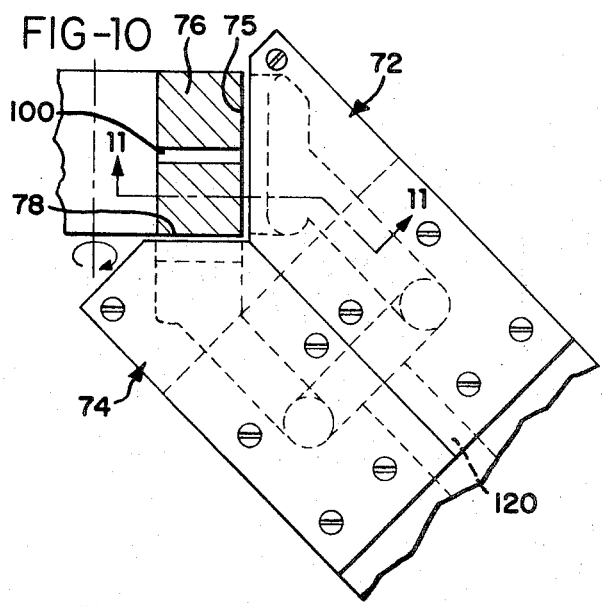
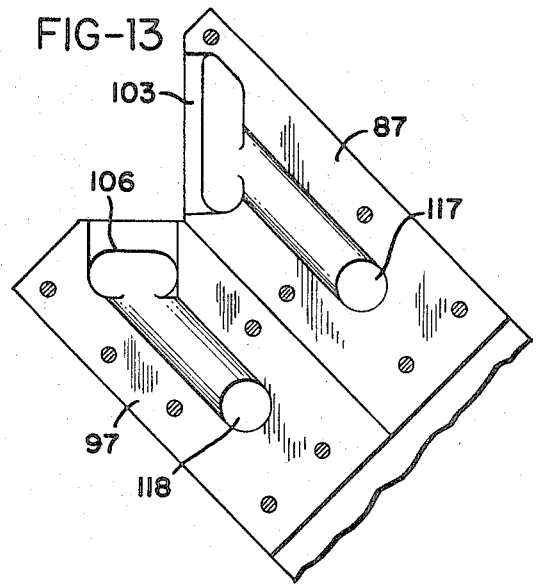
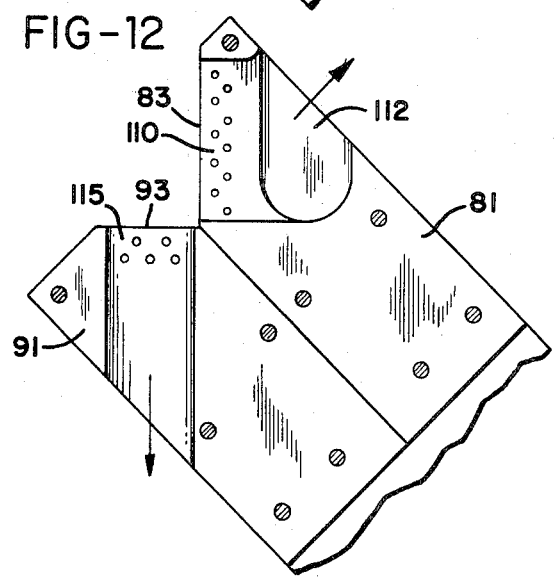
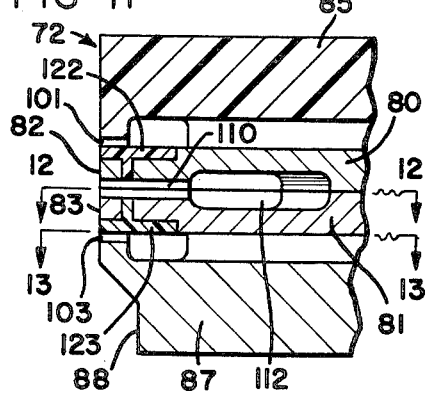

ELECTROCHEMICAL MACHINING TOOL FOR MACHINING CONJUGATE SURFACES OF REVOLUTION

BACKGROUND OF THE INVENTION

Certain machined items, such as roller bearing races, require that the relationship between the surfaces be maintained to a high degree of accuracy in order to derive the maximum load carrying ability and life from the part. In roller bearing races, a plurality of tapered roller bearings roll against a conical bearing surface which has a crown formed thereon to improve its load carrying ability. Furthermore, the large end of the rollers contact a rib, and under load, this rib maintains the rollers in alignment and prevents them from skewing relative to the conical bearing surface. The area of contact between the rollers and the rib is maintained as small as possible to reduce friction. A properly designed roller bearing, therefore, is capable of carrying heavy loads with minimum friction.

In the machining of roller bearing races by conventional methods, several separate grinding operations are performed on each workpiece. With conventional grinding tools, for example, a bearing race is first turned on a screw machine to its approximate shape and thereafter heat treated. The faces of the bearing are then ground parallel to each other. The outside diameter of the race is first rough ground and then finish ground. Next, the rib is rough ground and then finish ground. Finally, the inside diameter of the race is ground and the outside diameter of the bearing surface is honed. The surface finish from such an operation can be expected to be in the order of seven microinch. To perform the operation as indicated above normally requires the use of three grinders and one honing machine.

For proper bearing operation, the rib and the outside diameter of the race should be maintained in a predetermined angular relation. However, the geometry of the conical bearing surface and its relationship to the machined surface of the rib cannot accurately be maintained for long production runs by a grinding machine since the grinding tool will itself change dimension from part to part as it wears. Thus, the accuracy will depend on the type of grinding wheel used, the accuracy maintained in dressing the wheel, and the amount of wear which the wheel receives.

SUMMARY OF THE INVENTION

This invention relates to an electrochemical machining tool wherein a plurality of angularly related surfaces are machined simultaneously by a single tool. More particularly, this invention relates to an electrochemical machining tool for use in forming surfaces of revolution, one of which is a peripheral surface.

In machining roller bearing races using the electrochemical machining tool of this invention, the workpiece is first turned on a screw machine, heat treated, and then the faces of the bearing are ground parallel to each other. The bore through the part is then ground to its final inside diameter. Finally, the outside diameter of the bearing race and the machined surface of the rib are machined to their final dimensions simultaneously. Surface finishes in the order of three to four microinch can be expected, depending upon the amount of stock removed during the electrochemical machining operation. Thus, using one electrochemical machining tool, the separate steps or rough and finish grinding the conical bearing surface and rough and finish grinding the rib can be combined into a single machining operation. Also, surface finishes thus obtained from electrochemical machining are superior to that usually obtainable from conventional grinding tools.

In the embodiments of the invention disclosed herein, two adjacent machining surfaces having a predetermined angular relationship are supplied with electrical current from a common power source. Electrolyte is directed through channels adjacent these machining surfaces, and these channels are so positioned that the electrolyte will flow from the channel, between the tool and the workpiece and across the machining surfaces toward the smallest radial gap dimension. The area of the tool is also designed so that the gap dimension in a direction perpendicular to the direction of relative movement is maintained within predetermined limits throughout the machining operation. In some cases, this dimension is maintained constant, and in the case of machining a bearing surface which includes a crown, this transverse dimension will necessarily change as the machining operation proceeds.

By using a single tool having a plurality of machining surfaces, long production runs of machine parts can be made, with each part being machined to the same dimensions and with the angular relationship of the surfaces on the parts being maintained constant since the machining surfaces of the tool and their relation to each other remains unchanged since the tool itself is unaffected by the machining operation.

It is therefore an object of this invention to provide an improved electrochemical machining tool of the type described for machining simultaneously a plurality of conjugate surfaces on a rotating workpiece where the machining surfaces of the tool are so dimensioned in the direction of relative rotary movement that the transverse gap dimensions between the tool on the workpiece are maintained substantially constant throughout he machining of the workpiece; to provide an electrochemical machining tool of the type described wherein electrolyte is introduced between each machining surface of the tool and the workpiece so that the electrolyte flows across the machining surface of the tool toward the smallest radial gap dimension; and to provide an electrochemical machining tool of the type described wherein parts of high surface finishes and consistent dimensions and angular relation are obtained through long machining runs since the machining surfaces of the tool are unaffected by the machining operation.

Other objects and advantages of the invention will be apparent from the following description, the accompanying drawings and the appended claims.

BRIEF DESCRIPTION OF THE DRAWINGS

FIG. 7 is an elevational view showing another embodiment of a tool for machining conjugate surfaces of revolution;

FIG. 8 is a view of a portion of the tool showing one of the machining surfaces;

FIG. 9 is a view of a portion of the tool showing the other machining surface;

FIG. 10 is a plan view of the tool shown in FIG. 7 with the workpiece shown in cross section;

FIG. 11 is a cross sectional view taken along line 11—11 in FIG. 10;

FIG. 12 is a view taken along line 12—12 in FIG. 11; and

FIG. 13 is a view taken along line 13—13 in FIG. 11.

DETAILED DESCRIPTION OF THE PREFERRED EMBODIMENT

Figure 1:
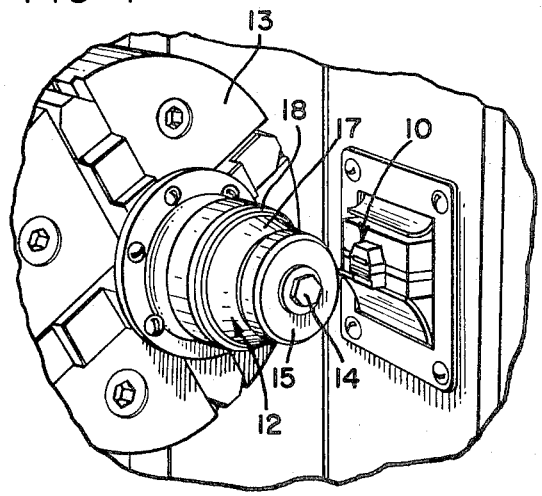
FIG. 1 is a perspective view showing a bearing race mounted for rotational movement and one embodiment of the electrochemical machining tool constructed according to this invention.

In FIG. 1, an electrochemical machining tool, shown generally at 10, is mounted for movement relative to a bearing race or workpiece 12, and the workpiece is held on a chuck 13 by a bolt 14 which extends through a retaining ring 15. The workpiece 12 includes a conical bearing surface 17 and a rib 18, both of which will be machined simultaneously to final dimensions by the tool 10.

Figure 2:
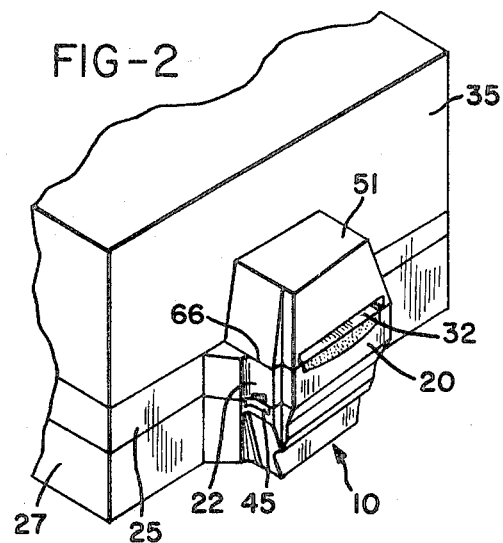
FIG. 2 is an isometric view of one embodiment of the electrochemical machining tool for machining simultaneously conjugate surfaces on a bearing race.
Figure 3:
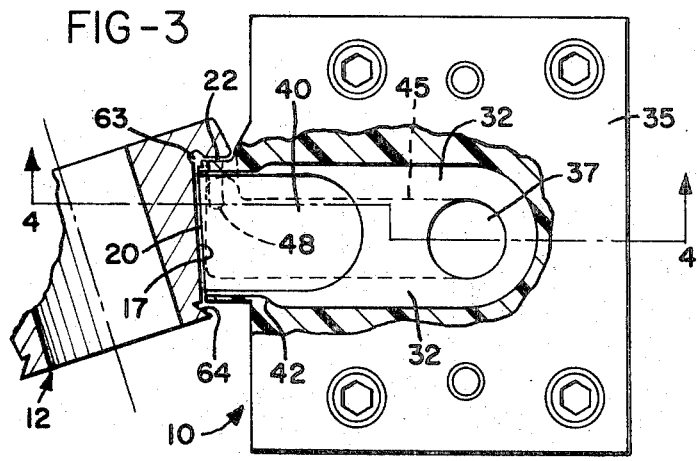
FIG. 3 is a plan view showing the electrochemical machining tool of FIG. 2, partly in cross section, and the relationship of the tool to the bearing race, also shown in cross section.
Figure 4:
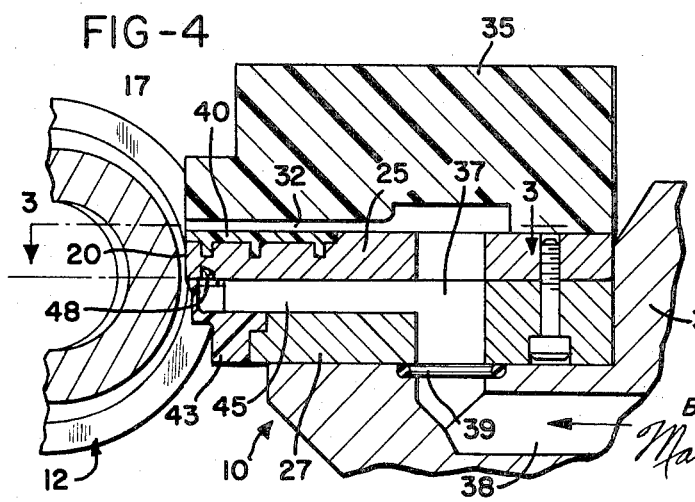
FIG. 4 is a cross sectional view taken along line 4—4 in FIG. 3.
Figure 6:
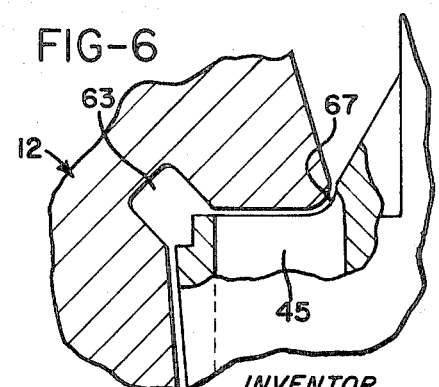
FIG. 6 is an enlarged view, with the tool shown partly in cross section, showing a portion of the machining surface on the tool for machining the rib.

The tool 10, as shown in FIGS. 2—6, includes a first machining surface 20 which is designed to machine the conical bearing surface 17, and a second machining surface 22 which is designed to machine the rib 18. Both of these machining surfaces are formed on a single brass member 25 which, as shown in FIG. 4, extends through the tool and is secured to a supporting member 27, also formed from brass or other suitable electrically conductive material. The supporting member 27 is mounted on a tool support 30, also electrically conductive, which can move the tool by suitable means, not shown, relative to the workpiece 12.

Figure 5:
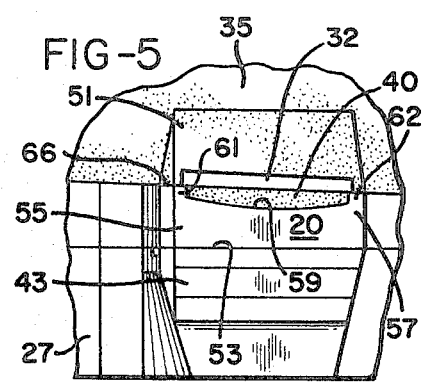
FIG. 5 is an enlarged elevational view showing primarily the surface on the tool which machines the conical bearing surface on the bearing race.

The first machining surface 20 has associated therewith an electrolyte channel 32 which, as shown in FIGS. 4 and 5, is formed in a block of insulating material 35. In the preferred embodiment, this insulating material 35 is a rigid, non-conductive fiberglass laminate, such as Formica type FF91. The channel 32 extends inwardly of the tool and communicates with a vertical opening 37 which extends through both the brass member 25 and the supporting member 27 into electrolyte port 38 in the tool support 30. An O-ring 39 seals the connection between the electrolyte port 38 and the vertical opening 37.

Insulation 40 is placed on the opposite side of the electrolyte channel 32 from the insulating member 35 in order to insure that no electrochemical machining action is caused by current flowing from the interior of the electrolyte channel. The insulating material is an epoxy type material, and possesses essentially the same coefficient of thermal expansion as the material used for the tool. Additionally, the insulating material is non-porous, resistant to absorption of moisture for preventing passage of current through the insulating material to the workpiece, and relatively chemically inert with respect to the electrolyte being used. Typical insulating materials including casting resin type RP-3,260 available from Renn Plastics, Inc. of Lansing, Mich., or STYCAST casting resin type 2651 MM, available from Emerson and Cuming of Canton, Mass.

As shown in FIG. 3, the electrolyte channel 32 narrows at 42 as it approaches the machining surface of the tool. This narrowing of the channel insures that electrolyte flows smoothly, without bubbles or gas, over the machining surface 20 and between the tool and the workpiece. In the embodiments shown herein, a sodium nitrate electrolyte is introduced into the channel under a pressure of approximately 350 psi to insure an adequate rate of flow across the surfaces of the tool to remove the reaction products of the electrochemical machining operation.

As shown in FIG. 4, the forward portion 43 of the member 27 is also formed from an insulating material, such as epoxy, to restrict the electrochemical machining action to the machining surfaces 20 and 22.

The second machining surface 22 is formed adjacent the first machining surface 20 and will form a machined surface on the rib 18. This second machining surface has an electrolyte channel 45 formed in the supporting member 27. The channel 45 communicates with the vertical opening 37 and receives electrolyte from the electrolyte port 38 in the tool support. The channel 45 also reduces in area as it approaches its outlet located below the machining surface 22, as viewed in FIG. 2. Insulating material 48 is formed in the upper portion of the channel in the brass member 25 at the electrolyte outlet to prevent stray electrochemical machining action from the interior of the electrolyte channel, thus restricting the electrochemical machining action to the machining surface 22.

Referring to FIGS. 2 and 5, the insulating member 35 includes a forwardly projecting portion 51 having a forward surface which is flush with the machining surface 20. The lower edge 53 of machining surface 20 is straight and is placed, as shown in FIG. 4, on a radius of the workpiece 12 with the machining surface 20 perpendicular to this radius. The tool remains in this orientation as it is fed inwardly toward the workpiece. Thus, the smallest gap dimension between the tool and the workpiece will be opposite the edge 53.

Since the surface 17 of the workpiece is conical, the workpiece material at the larger diameter end of the surface will move faster than the material at its smaller diameter end. To insure that the workpiece material is removed at the same rate regardless of its location, thus to maintain the transverse gap dimension substantially constant, the machining surface 20 is tapered with its larger end 55 located opposite the larger diameter portion of the workpiece and the smaller end 57 located opposite the smaller diameter of the workpiece. By maintaining the transverse gap dimension within predetermined limits, i.e., between 0.001 and 0.005 inch, and by imposing a voltage across the gap in the range of between ten and forty volts, the current density across the machined surface of the workpiece will be at a high, substantially constant, level of approximately 6000 amperes per square inch, thus giving a uniform appearance and microinch finish to this surface.

In the case of roller bearings it is sometimes desired to crown the bearing surface 17 to improve its load carrying ability. In the preferred embodiment, the upper edge 59 of the tool is curved to vary the length of the tool in the direction of relative movement. Greater accuracy in the finished product is obtained in this manner than by attempting to curve the outer machining surface of the tool. A change in the tool length by 0.001 inch will cause a change in the removal of the workpiece by 0.00001 inch, a factor of 100:1. It is obviously easier to form the tool to accuracies of thousandths of an inch in the direction of relative movement than to curve the tool to accuracies of millionths of an inch. Accordingly, the machining surface of the tool is lapped so that it is flat, and the crown on the workpice is controlled by the radius of the curve which forms the edge 59.

The machining surface 20 is also provided with extensions 61 and 62 which assist in removing material at the edge of the bearing race on the workpiece.

As shown in FIG. 4, the electrolyte exiting from the electrolyte channel 32 will flow downwardly between the tool and the workpiece and across the machining surface 20 in a direction toward the smallest radial gap dimension. By flowing electrolyte in this direction, the formation of gas bubbles and cavitation in the electrolyte is minimized. Also, since the smallest radial gap dimension occurs opposite the straight edge 53, high surface finishes and accurate dimensioning of the part can be maintained since the highest density electrical current flows from this location, which is the last portion of the tool which the workpiece surface passes when the preferred direction of part rotation is used.

With respect to the machining surface 22, it will be placed adjacent the rib 18 to cause machining thereof. The angular relationship between the rib 18 and the surface 17 will be controlled by the relative angular relationship between the machining surfaces 20 and 22. In the embodiment shown, the angle between the rib 18 and the surface 17 is an acute angle, i.e., less than 90°. Therefore, the upper edge 66 of the machining surface 22 will be closer to the rib 18 than any other part of the machining surface, and as a result, the electrolyte channel will be located at the opposite end of the machining surface so that electrolyte again will flow toward the smallest gap dimension again to minimize the formation of gas bubbles and cavitation of the electrolyte.

The machining surface 22 also includes a curved portion 67 (FIG. 6) which machines a radius on the edge of the rib 18.

In order to maintain the proper gap between both machining surfaces and the workpiece, it will be necessary to feed the surface 22 toward the rib 18 at the same time the surface 20 is fed toward the surface 17.

Thus, an electrochemical machining tool having a pair of angularly related machining surfaces has been described for machining simultaneously a pair of surfaces on a workpiece, the angular relationship between which must be held to close tolerances in order to provide the greatest load carrying ability and minimum friction.

Another embodiment of the invention is shown in FIGS. 7-13. This embodiment is particularly adapted for machining simultaneously a peripheral surface and a radial surface on a single workpiece. In the embodiment shown, th radial and peripheral surfaces are to be machined at a predetermined angle of 90°. The tool includes a base 70, a first machining member 72 and a second machining member 74. The first machining member 72 is adapted to machine a peripheral surface 75 of a workpiece 76 (FIG. 10), while the second machining member 74 is adapted to machine a radial surface 78 of the workpiece 76.

As shown in FIG. 8, the first machining member 72 includes two brass plates 80 and 81 having outwardly facing machining surfaces 82 and 83, respectively. An insulating member 85 is mounted on top of the brass plate 80, and a support member 87 is mounted adjacent the brass member 81. In a preferred embodiment, the member 87 is formed from brass to assist in conducting electrical current through the members 80 and 81 to the machining surfaces of the tool. The outer face 88 of the support member 87 is coated with an insulating paint to prevent stray electrochemical machining currents from flowing between the workpiece and the tool at that location.

Similarly, the second machining member 74, shown in FIG. 9, includes two brass plates 90 and 91, each having machining surfaces 92 and 93, respectively. These machining surfaces, however, are tapered in order to machine evenly the surface 78 on the workpiece since the outermost portion of the workpiece travels at a greater velocity than the innermost portion, and therefore the machining rate would be unequal unless compensated for by the shape of the tool. An insulating member 95 is mounted on top of the plate 90, and the whole assembly is mounted on a support member 97. Again, the support member 97 is formed from an electrically conductive material, such as brass, and it is coated on its outermost surface 98 with a layer of insulating paint to prevent stray electrical currents from flowing therethrough.

The workpiece 76 may include one or more openings 100 (FIG. 10), such as a lubricating passage, and it therefore becomes necessary to provide an electrochemical machining tool in which the electrolyte flow between the tool and the workpiece is not seriously affected by these openings. Accordingly, in the embodiment shown in FIGS. 7—13, two electrolyte openings are provided for each tool. As shown in FIGS. 8 and 11, the first machining member 72 includes a first electrolyte passage 101 located above the machining surface 82, and a second electrolyte passage 103 located below the machining surface 83. Similarly, the second machining member 74 includes electrolyte passages 105 and 106.

Since the electrolyte may flow from both of the ports 101 and 103 toward the center of the tool, a relief opening 110 is provided. This opening 110 communicates with an exit port 112 (FIG. 11) which allows the electrolyte to be discharged outside the tool, as shown in FIG. 12. Similarly, the second machine member 74 includes an electrolyte exit opening 115 which communicates directly with the outside of the tool, as shown in FIG. 12, to relieve any buildup of electrolyte between the machining surfaces 92 and 93.

As shown in FIGS. 11 and 13, the electrolyte openings 101, 103, 105 and 106 are formed in the members 85, 87, 95 and 97, respectively. These electrolyte openings communicate with vertically extending passages 117 and 118. These passages, in turn, communicate with an electrolyte port 120 through which electrolyte is forced under sufficient pressure to cause a high velocity flow between the tool and workpiece.

The volume of the passageway in the member 87 is larger than the opening 103 to insure that sufficient electrolyte flows out the opening 103 to cover completely the machining surface 83 and fill the space between the tool and the workpiece. The same is true for the other electrolyte openings.

Insulation is placed within each electrolyte channel to insure that no stray electrical currents flow through the channel to machine the workpiece. Thus, as shown in FIGS. 8 and 11, the first machining member 72 includes insulaton 122 and 123 formed in the plates 80 and 81, respectively. This insulation preferably is epoxy and has the same coefficient of expansion, as the material to which it is bonded. This insures that, as the tool heats during the electrochemical machining operation, the forward surface of the tool remains perfectly flat, thus preventing the introduction of any turbulence in the flow of electrolyte due to discontinuity between the forward surface of the tool and the insulation. Insulation may also be found in the second machining member 74. Thus, the insulation 125 and 127 is found in the electrolyte channels adjacent the machining surfaces 92 and 93, respectively (FIG. 9).

While the forms of apparatus herein described constitute preferred embodiments of the invention, it is to be understood that the invention is not limited to these precise forms of apparatus, and that changes may be made therein without departing from the scope of the invention.

What is claimed is:

1. An electrochemical machining tool for machining simultaneously a plurality of surfaces of revolution on a rotating workpiece to precise final dimensions and predetermined angular relationships to each other, said tool comprising
    an electrochemical machining tool having a plurality of machining surfaces thereon for machining the surfaces of a workpiece;
    each of said machining surfaces of said tool being substantially flat in the direction of relative rotary movement and so dimensioned in such direction that transverse gap dimensions between the tool and workpiece are maintained within predetermined limits throughout the machining of the workpiece; and
    means defining an electrolyte channel for each machining surface through which electrolyte is introduced into each said gap, each said electrolyte channel being so positioned with respect to its machining surface that electrolyte flows from said electrolyte channel across each said machining surface in a direction parallel to the direction of relative movement toward the smallest gap dimension.

2. The tool as defined in claim 1 wherein each said transverse gap dimension is maintained substantially constant throughout the machining of the workpiece.

3. The tool as defined in claim 1 further including means for moving said tool relative to said workpiece as material is electrochemically removed to maintain said radial gap dimensions substantially constant.

4. The tool defined in claim 1 further including means insulating each said electrolyte channel further to restrict the flow of electrical current between the workpiece and the tool to the area defined by the machining surfaces of the tool.

5. A method of electrochemically machining a plurality of surfaces of revolution on a workpiece simultaneously to precise final dimensions and predetermined angular relationships to each other, the method including the steps of
    rotating the workpiece;
    placing an electrochemical machining tool having a plurality of machining surfaces thereon for machining the surfaces of the workpiece adjacent the workpiece with the machining surfaces of the tool forming gaps having predetermined transverse dimensions between said respective machining surfaces of the tool and workpiece;
    each of said machining surfaces of said tool being substantially flat in the direction of relative movement and so dimensioned in such direction that said transverse gap dimensions are maintained within predetermined limits throughout the machining of the workpiece;
    introducing electrolyte into the plurality of gaps formed between the workpiece and tool so that electrolyte flows across each machining surface toward the smallest gap dimension; and
    supplying electrical current between said tool and the workpiece such that the workpiece is anodic with respect to said tool so that workpiece material is electrochemically removed from the workpiece surface as it rotates past said tool.

* * * * *